(12) United States Patent
Atti et al.

(10) Patent No.: US 9,111,531 B2
(45) Date of Patent: Aug. 18, 2015

(54) MULTIPLE CODING MODE SIGNAL CLASSIFICATION

(71) Applicant: QUALCOMM Incorporated, San Diego, CA (US)

(72) Inventors: Venkatraman Srinivasa Atti, San Diego, CA (US); Ethan Robert Duni, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 13/722,669

(22) Filed: Dec. 20, 2012

(65) Prior Publication Data

US 2013/0185063 A1 Jul. 18, 2013

Related U.S. Application Data

(60) Provisional application No. 61/586,374, filed on Jan. 13, 2012.

(51) Int. Cl.
*G10L 19/00* (2013.01)
*G10L 21/00* (2013.01)
*G10L 17/02* (2013.01)
*G10L 19/20* (2013.01)
*G10L 19/22* (2013.01)
G10L 19/02 (2013.01)
G10L 25/81 (2013.01)
G10L 19/12 (2013.01)

(52) U.S. Cl.
CPC ............... *G10L 17/02* (2013.01); *G10L 19/20* (2013.01); *G10L 19/22* (2013.01); *G10L 19/0212* (2013.01); *G10L 19/12* (2013.01); *G10L 25/81* (2013.01)

(58) Field of Classification Search
CPC ......... G10L 19/12; G10L 19/00; G10L 21/00; G10L 19/04; G10L 19/02; G10L 19/06; G10L 19/22; G10L 19/24; G10L 15/08; G10L 19/18; G10H 2210/315
USPC ......... 704/201, 219, 221, E19.032, 35, 43, 44
See application file for complete search history.

(56) References Cited

U.S. PATENT DOCUMENTS

| | | | | |
|---|---|---|---|---|
| 5,414,796 | A | * | 5/1995 | Jacobs et al. ................. 704/221 |
| 5,778,335 | A | | 7/1998 | Ubale et al. |
| 6,493,665 | B1 | * | 12/2002 | Su et al. ........................ 704/230 |
| 6,604,070 | B1 | * | 8/2003 | Gao et al. ...................... 704/222 |

(Continued)

OTHER PUBLICATIONS

International Search Report—PCT/US2012/071217—ISAEPO—May 16, 2013.

*Primary Examiner* — Edgar Guerra-Erazo
(74) *Attorney, Agent, or Firm* — Austin Rapp & Hardman

(57) ABSTRACT

Improved audio classification is provided for encoding applications. An initial classification is performed, followed by a finer classification, to produce speech classifications and music classifications with higher accuracy and less complexity than previously available. Audio is classified as speech or music on a frame by frame basis. If the frame is classified as music by the initial classification, that frame undergoes a second, finer classification to confirm that the frame is music and not speech (e.g., speech that is tonal and/or structured that may not have been classified as speech by the initial classification). Depending on the implementation, one or more parameters may be used in the finer classification. Example parameters include voicing, modified correlation, signal activity, and long term pitch gain.

40 Claims, 5 Drawing Sheets

(56) References Cited

U.S. PATENT DOCUMENTS

| | | | |
|---|---|---|---|
| 6,625,226 B1* | 9/2003 | Gersho et al. | 375/285 |
| 6,694,293 B2 | 2/2004 | Benyassine et al. | |
| 6,988,065 B1* | 1/2006 | Yasunaga et al. | 704/219 |
| 7,272,556 B1* | 9/2007 | Aguilar et al. | 704/230 |
| 8,010,350 B2 | 8/2011 | Zopf | |
| 8,438,019 B2* | 5/2013 | Vainio et al. | 704/223 |
| 2003/0101050 A1 | 5/2003 | Khalil et al. | |
| 2003/0177004 A1* | 9/2003 | Jabri et al. | 704/219 |
| 2005/0177364 A1* | 8/2005 | Jelinek | 704/214 |
| 2006/0089833 A1* | 4/2006 | Su et al. | 704/230 |
| 2008/0162121 A1 | 7/2008 | Son et al. | |
| 2009/0024386 A1* | 1/2009 | Su et al. | 704/201 |
| 2009/0204396 A1* | 8/2009 | Xu et al. | 704/207 |
| 2009/0319262 A1* | 12/2009 | Gupta et al. | 704/207 |
| 2010/0070284 A1 | 3/2010 | Oh et al. | |
| 2011/0202337 A1 | 8/2011 | Fuchs et al. | |
| 2012/0209599 A1 | 8/2012 | Malenovsky | |

\* cited by examiner

MULTIPLE CODING MODE SIGNAL CLASSIFICATION

CROSS-REFERENCE TO RELATED APPLICATIONS

This application claims priority under the benefit of 35 U.S.C. §119(e) to Provisional Patent Application No. 61/586,374, filed Jan. 13, 2012. This provisional patent application is hereby expressly incorporated by reference herein in its entirety.

BACKGROUND

Transmission of voice (also referred to as speech) and music by digital techniques has become widespread and incorporated into a wide range of devices, including, wireless communication devices, personal digital assistants (PDAs), laptop computers, desktop computers, mobile and/or satellite radio telephones, and the like. An exemplary field is wireless communications. The field of wireless communications has many applications including, e.g., cordless telephones, paging, wireless local loops, wireless telephony such as cellular and PCS telephone systems, mobile Internet Protocol (IP) telephony, and satellite communication systems.

In telecommunications networks, information is transferred in an encoded form between a transmitting communication device and a receiving communication device. The transmitting communication device encodes original information, such as voice signals and/or music signals, into encoded information and sends it to the receiving communication device. The receiving communication device decodes the received encoded information to recreate the original information. The encoding and decoding is performed using codecs. The encoding of voice signals and/or music signals is performed in a codec located in the transmitting communication device, and the decoding is performed in a codec located in the receiving communication device.

In modern codecs, multiple coding modes are included to handle different types of input sources, such as speech, music, and mixed content. For optimal performance, the optimal coding mode for each frame of the input signal should be selected and used. Accurate classification is necessary for selecting the most efficient coding schemes and achieving the lowest data rate.

This classification can be carried out in an open-loop manner to save complexity. In this case, the optimal mode classifier should take major features of the various coding modes into account. Some modes (such as speech coding modes like algebraic code excited linear prediction (ACELP)) contain an adaptive codebook (ACB) that exploits correlation between the past and current frames. Some other modes (such as modified discrete cosine transform (MDCT) coding modes for music/audio) may not contain such a feature. Thus, it is important to ensure that input frames having high correlation with the previous frame are classified into the mode which has ACB or that includes other inter-frame correlation modeling techniques.

Previous solutions have used closed-loop mode decisions (e.g., AMR-WB+, USAC) or various types of open-loop decisions (e.g., AMR-WB+, EVRC-WB), but these solutions are either complex or their performances have been prone to errors.

SUMMARY

Improved audio classification is provided for encoding applications. An initial classification is performed, followed by a finer classification, to produce speech classifications and music classifications with higher accuracy and less complexity than previously available.

Audio is classified as speech or music on a portion by portion (e.g., frame by frame) basis. If the frame is classified as music by the initial classification, that frame undergoes a second, finer classification to confirm that the frame is music and not speech (e.g., speech that is tonal and/or structured that may not have been classified as speech by the initial classification).

Depending on the implementation, one or more parameters may be used in the finer classification. Example parameters include voicing, modified correlation, signal activity, and long term pitch gain. These parameters are examples only, and are not meant to be limiting.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

The disclosed embodiments present classification techniques for a variety of coding modes in environments with various types of audio such as speech and music. Types of audio frames can be reliably and accurately identified for encoding in the most efficient manner. Although the examples and description herein refer to audio frames, more generally portions of audio signals are contemplated and may be used in accordance with the implementations described herein.

Figure 1A:
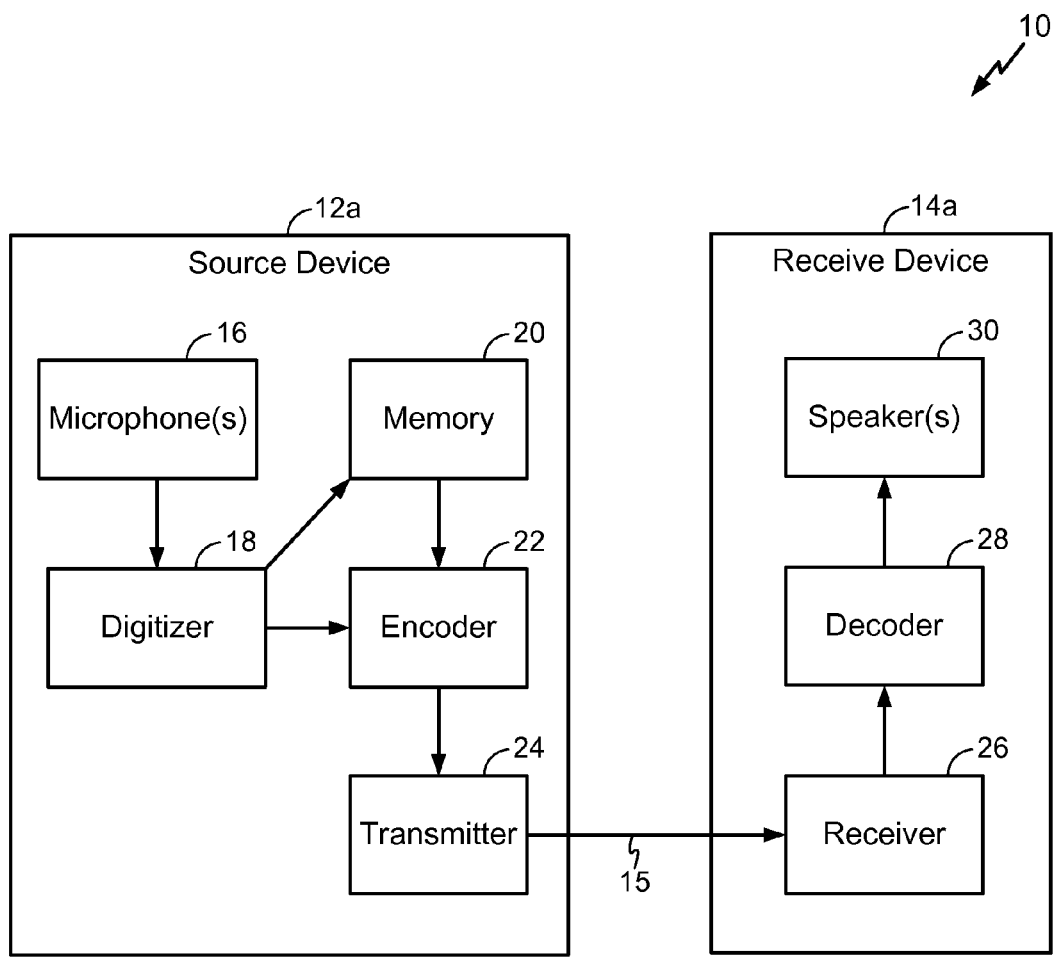
FIG. 1A is a block diagram illustrating an example system in which a source device transmits an encoded bit-stream to a receive device.

FIG. 1A is a block diagram illustrating an example system 10 in which a source device 12a transmits an encoded bit-stream via a communication link 15 to a receive device 14a. The bitstream may be represented as one or more packets. Source device 12a and receive device 14a may both be digital devices. In particular, source device 12a may encode data consistent with the 3GPP2 EVRC-B standard, or similar standards that make use of encoding data into packets for speech compression. One or both of devices 12a, 14a of system 10 may implement selections of encoding modes (based on different coding models) and encoding rates for audio (e.g., speech and/or music) compression, as described in greater detail below, in order to improve the audio encoding process.

Figure 4:
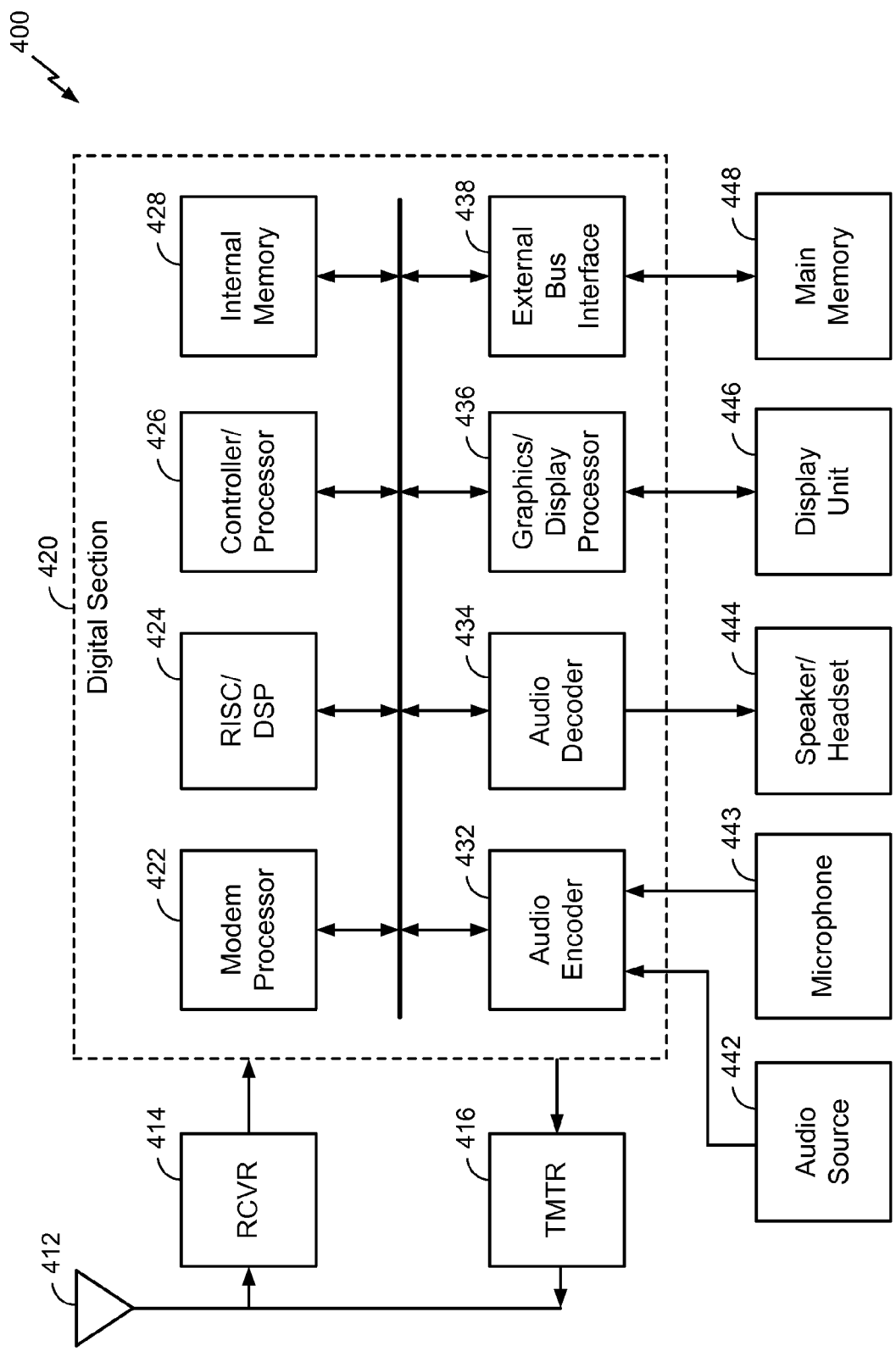
FIG. 4 is a diagram of an example mobile station.

An example mobile station, which may comprise a source device or a receive device, is described with respect to FIG. 4.

Communication link 15 may comprise a wireless link, a physical transmission line, fiber optics, a packet based network such as a local area network, wide-area network, or global network such as the Internet, a public switched telephone network (PSTN), or any other communication link capable of transferring data. The communication link 15 may be coupled to a storage media. Thus, communication link 15 represents any suitable communication medium, or possibly a collection of different networks and links, for transmitting compressed speech data from source device 12a to receive device 14a.

Source device 12a may include one or more microphones 16 that capture sound. The continuous sound is sent to digitizer 18. Digitizer 18 samples the sound at discrete intervals and quantizes (digitizes) speech. The digitized speech may be stored in memory 20 and/or sent to an encoder 22 where the digitized speech samples may be encoded, often over a 20 ms frame.

More particularly, the encoder divides the incoming speech signal into blocks of time, or analysis frames or portions. The duration of each segment in time (or frame) is typically selected to be short enough that the spectral envelope of the signal may be expected to remain relatively stationary. For example, one typical frame length is twenty milliseconds (20 ms), which corresponds to 160 samples at a typical sampling rate of eight kilohertz (8 kHz), although any frame length or sampling rate deemed suitable for the particular application may be used.

The encoding process performed in encoder 22 produces one or more packets, to send to transmitter 24, which may be transmitted over communication link 15 to receive device 14a. For example, the encoder analyzes the incoming frame to extract certain relevant parameters, and then quantizes the parameters into binary representation, i.e., to a set of bits or a binary data packet. The data packets are transmitted over the communication channel (i.e., a wired and/or wireless network connection) to a receiver and a decoder. The decoder processes the data packets, unquantizes them to produce the parameters, and resynthesizes the audio frames using the unquantized parameters.

Encoder 22 may include, for example, various hardware, software or firmware, or one or more digital signal processors (DSP) that execute programmable software modules to control the encoding techniques, as described herein. Associated memory and logic circuitry may be provided to support the DSP in controlling the encoding techniques. As will be described, encoder 22 may perform more robustly if encoding modes and rates may be changed prior and/or during encoding depending on whether a speech frame or a music frame has been determined and is being encoded.

Receive device 14a may take the form of any digital audio device capable of receiving and decoding audio data. For example, receive device 14a may include a receiver 26 to receive packets from transmitter 24, e.g., via intermediate links, routers, other network equipment, and the like. Receive device 14a also may include a decoder 28 for decoding the one or more packets, and one or more speakers 30 to allow a user to hear the reconstructed audio after decoding of the packets by speech decoder 28.

Figure 1B:
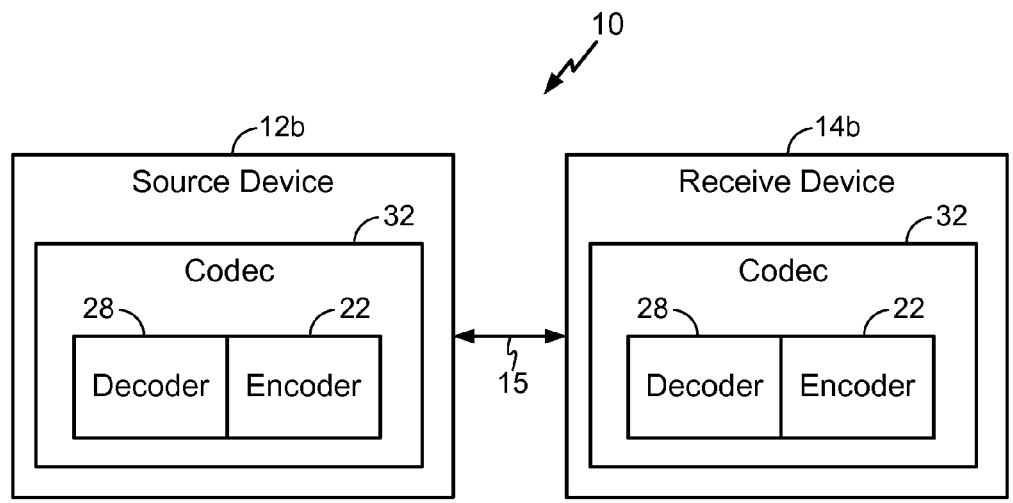
FIG. 1B is a block diagram of two devices that may be used as described herein.

In some cases, a source device 12b and receive device 14b may each include a speech encoder/decoder (codec) 32 as shown in FIG. 1B, for encoding and decoding digital audio data. In particular, both source device 12b and receive device 14b may include transmitters and receivers as well as memory and speakers. Many of the encoding techniques contemplated herein are described in the context of a digital audio device that includes an encoder for compressing speech and/or music.

It is understood, however, that the encoder may form part of a codec 32. In that case, the codec may be implemented within hardware, software, firmware, a DSP, a microprocessor, a general purpose processor, an application specific integrated circuit (ASIC), a field programmable gate array (FPGA), discrete hardware components, or various combinations thereof. Moreover, it is understood by those of skill in the art that coders may be implemented with a DSP, an ASIC, discrete gate logic, firmware, or any conventional programmable software module and a microprocessor. The software module could reside in RAM memory, flash memory, registers, or any other form of writable storage medium known in the art. Alternatively, any conventional processor, controller, or state machine could be substituted for the microprocessor. An example computing device is described with respect to FIG. 5.

Figure 2:
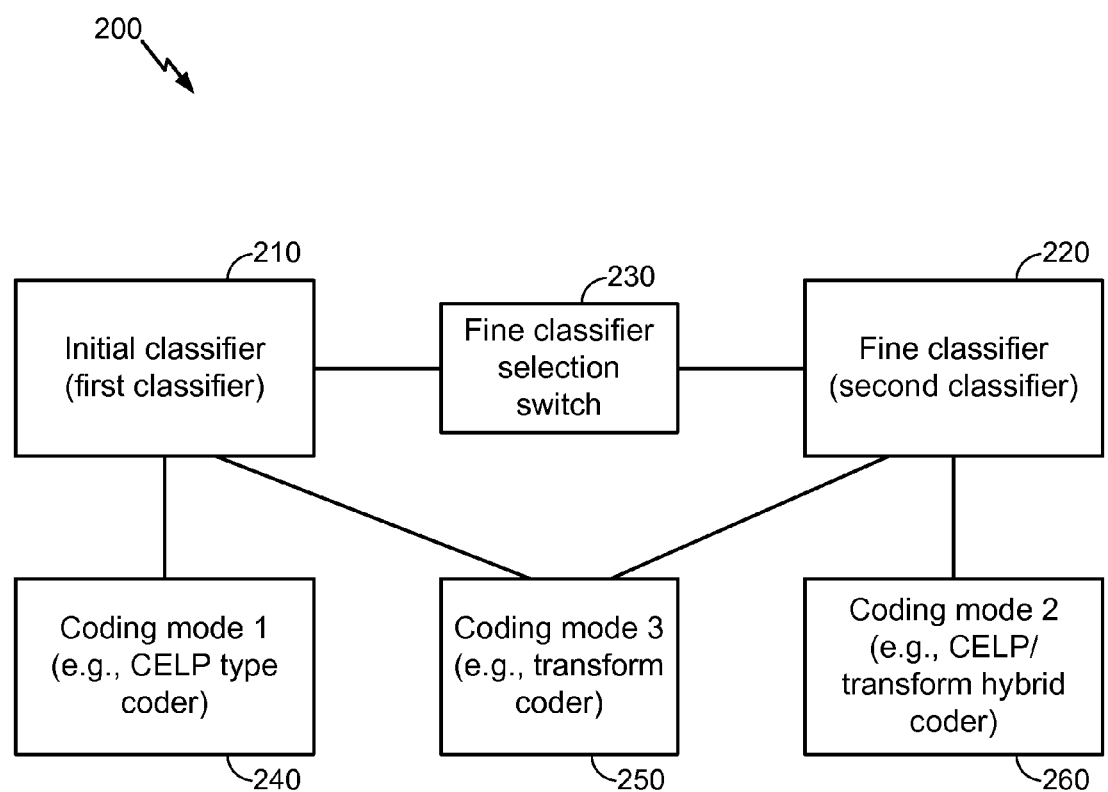
FIG. 2 is a block diagram of an implementation of a multiple coding mode signal classification and encoder system.

FIG. 2 is a block diagram of an implementation of a multiple coding mode signal classification and encoder system 200. In an implementation, the system 200 may be used with a device, such as a source device or receive device described with respect to FIGS. 1A and 1B. For example, the system 200 may operate in conjunction with the encoder 22 of the source device 12a.

The multiple coding mode signal classification and encoder system 200 comprises an initial classifier 210 (also referred to as a first classifier) and a fine classifier 220 (also referred to as a second classifier). The system 200 also comprises a fine classifier selection switch 230 which may be selected (e.g., by a user) to enable or disable the fine classifier 220 and its associated finer classification functionality.

Various types of coders are comprised within the system 200, such as speech coders and a music coder. In an implementation, a first coding mode, referred to as "coding mode 1" 240 (such as a code excited linear predictive (CELP) type coder, or a speech coding mode, for example) may be provided and used responsive to classification by the initial classifier 210. A second coding mode, referred to as "coding mode 2" 260 (such as a CELP/transform hybrid coder, or a second speech coding mode, for example) may be provided and used responsive to classification by the fine classifier 220.

A third coding mode, referred to as "coding mode 3" 250 (such as a transform coder, or a music coding mode, for example) may be provided and used responsive to classification by the initial classifier 210 and/or the fine classifier 220. These types of coding modes and coders are well known, and further descriptions are omitted for brevity. The example coding modes and coders described for coding modes 1, 2, and 3 are examples only and are not meant to be limiting. Any appropriate speech coding mode(s) and/or coder(s) and music coding mode(s) and/or coder(s) may be used.

Figure 3:
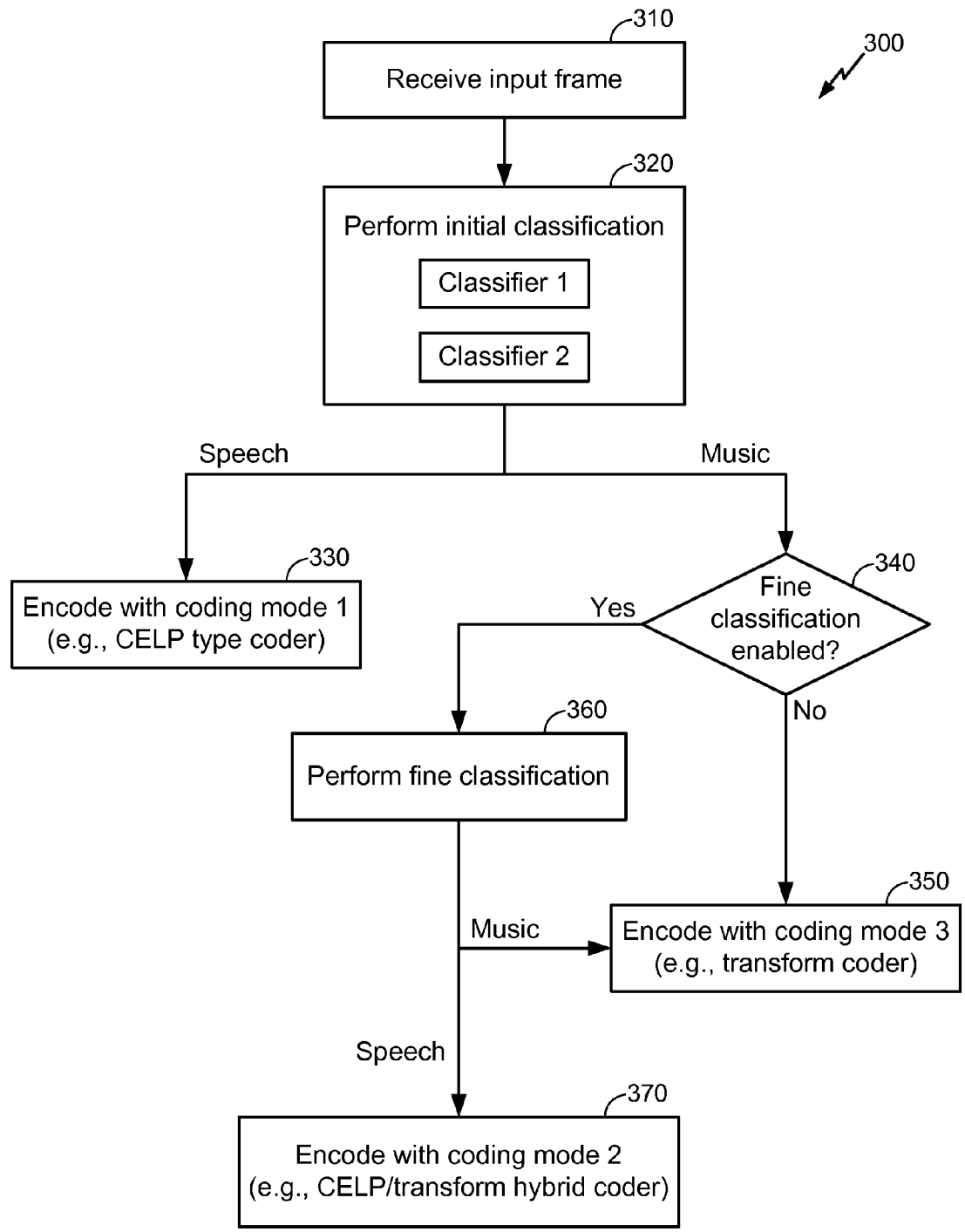
FIG. 3 is an operational flow of an implementation of a method for classifying audio.

FIG. 3 is an operational flow of an implementation of a method 300 for classifying audio. At 310, the initial classifier 210 receives an input audio frame (or other portion of an audio signal for classifying the portion of the audio signal as a speech-like audio signal or a music-like audio signal) and classifies it as speech or music at 320. The initial classifier 210 may be any classifier that classifies an audio frame or portion as speech or music.

In some implementations, the initial classifier 210 may comprise more than one classifier (shown in 320 as "classifier 1" and "classifier 2", though any number of classifiers may be used depending on the implementation). For example, the initial classifier may comprise a classifier that is fully biased towards speech, and another different classifier such as a classifier that is more biased towards music. These two classifiers may operate on the input frame sequentially or sometimes simultaneously (depending on the implementation) at 320, with their results being combined to form a result that is sent to either 330 or 340.

There is a small probability that speech will be detected as music by the initial classifier 210. As such, some speech frames may be initially classified as music. For example, speech in the presence of very low level background music or a singing voice, which are representative of speech, may not be classified as speech by the initial classifier 210. Instead, the initial classifier 210 may classify such signals as music. The presence of other background noise, such as vehicle horn honks in street noise or telephone rings in a typical office, for example, may also contribute to increased misclassification of speech as music.

If the frame is determined at 320 to be a speech frame by the initial classifier 210, then the frame is provided to coding mode 1 240 (e.g., a CELP type coder) for encoding. In some implementations, any known CELP type coder may be used.

If, on the other hand, the frame is determined at 320 to be a music frame by the initial classifier 210, then it is determined at 340 if a finer classification is enabled (e.g., by the user having previously enabled the feature, via an "on" and "off" selection switch on the device corresponding to "enabled" and "not enabled", respectively). This finer classification is a second round of classification that reinforces the decision of the first classification. In an implementation, the finer classification for processing audio data can be selectively enabled by a user.

If the finer classification is not enabled as determined at 340, then the frame is provided to coding mode 3 250 (e.g., a transform coder) for encoding as a music frame at 350. However, if the finer classification is enabled as determined at 340, then the frame is provided to the fine classifier 220 at 360 for an additional, finer classification. The finer classification is used to further distinguish a speech frame from a music frame.

In an implementation, the finer classification is used to confirm that the frame is broadband noise-like which is a characteristic of certain types of music, as opposed to tonal and/or quasi-stationary characteristics of voiced speech. If the finer classification at 360 results in the frame being identified as a music frame, then the frame is sent to the coding mode 3 for encoding as a music frame at 350.

If the finer classification at 360 results in the frame being identified as a speech frame, then the frame is sent to coding mode 2 260 for encoding as a speech frame at 370. As noted above, in an implementation, the coding mode 2 260 may be a CELP/transform hybrid coder, which may be used for coding tonal and/or structured speech frames. In an alternate implementation, the coding mode 2 260 at 370 may be a CELP type coder such as the coding mode 1 used at 330.

In an implementation, the finer classification performed at 360 (e.g., by the fine classifier 220) may compare various characteristics or features of the frame to one or more thresholds in order to determine whether the frame is a speech frame or a music frame.

In some implementations, the voicing of the frame may be compared to a first threshold THR1. If the voicing of the frame is greater than THR1, then it is determined that the frame is a speech frame. An example value for THR1 is 0.99, though any value may be used depending on the implementation. The voicing ranges from 0 (corresponding to no correlation with a speech frame) to 1 (corresponding to high correlation with a speech frame).

In some implementations, the weighted signal correlation may be compared to a second threshold THR2. If the weighted signal correlation is greater than THR2, then it is determined that the frame is a speech frame. An example value for THR2 is 0.87, though any value may be used depending on the implementation. The signal correlation ranges from 0 (corresponding to random noise) to 1 (corresponding to highly structured sound).

In some implementations, the long term pitch gain may be compared to a third threshold THR3. If the long term pitch gain is greater than THR3, then it is determined that the frame is a speech frame. An example value for THR3 is 0.5, though any value may be used depending on the implementation. The long term pitch gain is the normalized cross-correlation between the past excitation and the current prediction residual. The long term pitch gain ranges from 0 (indicating that the error in the past frame is not adequate in representing the current frame) to 1 (indicating that using the residual error in the past frame can completely represent the current frame).

In some implementations, the tonality of the current frame may be determined and compared to a threshold THR4. The tonality of a signal can be measured using a spectral flatness measure or a spectral peak to average ratio measure. If the spectrum does not contain any prominent localized peaks, then the spectral flatness measure would tend to be close to 1. On the other hand, if the spectrum exhibits a strong tilt with localized peaks, then the spectral flatness measure would be close to 0. If the tonality is greater than THR4, then it is determined that the frame is a speech frame. An example value for THR4 is 0.75, though any value may be used depending on the implementation.

Additionally or alternatively, in some implementations, it may be determined if there is any signal activity. If there is no signal activity (i.e., the frame is quiet), then it is determined that there is no useful signal to encode, and it may be encoded as a speech frame.

In some implementations, if none of the conditions are met for determining at 360 that the frame is a speech frame, then it is determined that the frame is a music frame.

The comparisons and thresholds described herein are not meant to be limiting, as any one or more comparisons and/or thresholds may be used depending on the implementation. Additional and/or alternative comparisons and thresholds may also be used, depending on the implementation.

Thus, in an implementation, if a frame is classified initially (by the initial classifier 210) as speech, it is passed to a CELP coder. If the frame is classified as music, however, then it is verified if a finer classification is enabled or not. The finer classification can be enabled using an external user control. If finer classification is not enabled, then the frame that is initially classified as music is routed to a transform coder for encoding. If the finer classification is enabled then a logical combination of certain criteria (e.g., voicing, modified correlation, signal activity, long term pitch gain, etc.) is used to select between a transform coder and a hybrid of CELP/transform coder. The THR1, THR2, THR3 and THR4 are threshold values that may be experimentally determined and depend on the sampling rates and signal types, for example.

In an implementation, strongly tonal signals are prevented from being coded in MDCT mode (which lacks adaptive codebook) and instead are provided to linear predictive coding (LPC) modes which utilize adaptive codebook.

The components of the coders and classifiers described herein may be implemented as electronic hardware, as computer software, or combinations of both. These components are described herein in terms of their functionality. Whether the functionality is implemented as hardware or software will depend upon the particular application and design constraints imposed on the overall system. Skilled artisans will recognize the interchangeability of hardware and software under these circumstances, and how best to implement the described functionality for each particular application.

As used herein, the term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The term "signal processing" (and grammatical variants thereof) may refer to the processing and interpretation of signals. Signals of interest may include sound, images, and many others. Processing of such signals may include storage and reconstruction, separation of information from noise, compression, and feature extraction. The term "digital signal processing" may refer to the study of signals in a digital representation and the processing methods of these signals. Digital signal processing is an element of many communications technologies such as mobile stations, non-mobile stations, and the Internet. The algorithms that are utilized for digital signal processing may be performed using specialized computers, which may make use of specialized microprocessors called digital signal processors (sometimes abbreviated as DSPs).

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa).

FIG. 4 shows a block diagram of a design of an example mobile station 400 in a wireless communication system. Mobile station 400 may be a cellular phone, a terminal, a handset, a PDA, a wireless modem, a cordless phone, etc. The wireless communication system may be a CDMA system, a GSM system, etc.

Mobile station 400 is capable of providing bidirectional communication via a receive path and a transmit path. On the receive path, signals transmitted by base stations are received by an antenna 412 and provided to a receiver (RCVR) 414. Receiver 414 conditions and digitizes the received signal and provides samples to a digital section 420 for further processing. On the transmit path, a transmitter (TMTR) 416 receives data to be transmitted from digital section 420, processes and conditions the data, and generates a modulated signal, which is transmitted via antenna 412 to the base stations. Receiver 414 and transmitter 416 may be part of a transceiver that may support CDMA, GSM, etc.

Digital section 420 includes various processing, interface, and memory units such as, for example, a modem processor 422, a reduced instruction set computer/digital signal processor (RISC/DSP) 424, a controller/processor 426, an internal memory 428, a generalized audio encoder 432, a generalized audio decoder 434, a graphics/display processor 436, and an external bus interface (EBI) 438. Modem processor 422 may perform processing for data transmission and reception, e.g., encoding, modulation, demodulation, and decoding. RISC/DSP 424 may perform general and specialized processing for wireless device 400. Controller/processor 426 may direct the operation of various processing and interface units within digital section 420. Internal memory 428 may store data and/or instructions for various units within digital section 420.

Generalized audio encoder 432 may perform encoding for input signals from an audio source 442, a microphone 443, etc. Generalized audio decoder 434 may perform decoding for coded audio data and may provide output signals to a speaker/headset 444. Graphics/display processor 436 may perform processing for graphics, videos, images, and texts, which may be presented to a display unit 446. EBI 438 may facilitate transfer of data between digital section 420 and a main memory 448.

Digital section 420 may be implemented with one or more processors, DSPs, microprocessors, RISCs, etc. Digital section 420 may also be fabricated on one or more application specific integrated circuits (ASICs) and/or some other type of integrated circuits (ICs).

Figure 5:
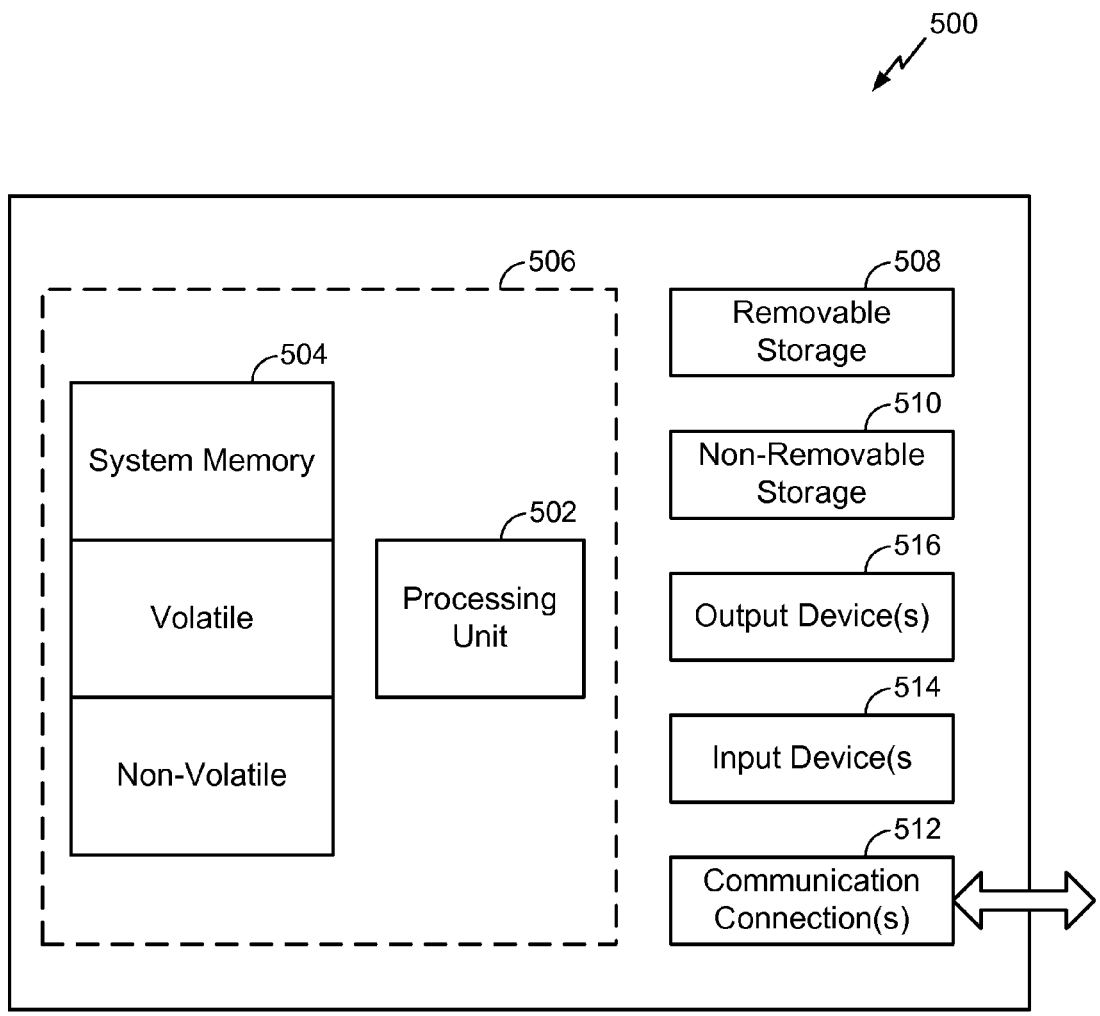
FIG. 5 shows an exemplary computing environment.

FIG. 5 shows an exemplary computing environment in which example implementations and aspects may be implemented. The computing system environment is only one example of a suitable computing environment and is not intended to suggest any limitation as to the scope of use or functionality.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features and/or functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer-readable media. Computer-readable media can be any available media that can be accessed by device 500 and include both volatile and non-volatile media, and removable and non-removable media. Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

In general, any device described herein may represent various types of devices, such as a wireless or wired phone, a cellular phone, a laptop computer, a wireless multimedia device, a wireless communication PC card, a PDA, an external or internal modem, a device that communicates through a wireless or wired channel, etc. A device may have various names, such as access terminal (AT), access unit, subscriber unit, mobile station, mobile device, mobile unit, mobile phone, mobile, remote station, remote terminal, remote unit, user device, user equipment, handheld device, non-mobile station, non-mobile device, endpoint, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), FPGAs, processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For a firmware and/or software implementation, the techniques may be embodied as instructions on a computer-readable medium, such as RAM, ROM, non-volatile RAM, programmable ROM, EEPROM, flash memory, compact disc (CD), magnetic or optical data storage device, or the like. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a portion of an audio signal at a first classifier in a digital audio device;
   classifying, by the digital audio device, the portion of the audio signal at the first classifier as speech or as music; and
   processing the portion of the audio signal, wherein processing the portion of the audio signal comprises:
   if the portion is classified by the first classifier as speech, then encoding, by the digital audio device, the speech using a first coding mode; or
   if the portion is classified by the first classifier as music, then:
   providing the portion to a second classifier in the digital audio device;
   classifying, by the digital audio device, the portion at the second classifier as speech or as music; and
   encoding the portion of the audio signal, wherein encoding the portion of the audio signal comprises:
   if the portion is classified at the second classifier as speech, then encoding, by the digital audio device, the portion using a second coding mode; or
   if the portion is classified at the second classifier as music, then encoding, by the digital audio device, the portion using a third coding mode.

2. The method of claim 1, wherein the portion of the audio signal is a frame.

3. The method of claim 1, wherein the first coding mode comprises a first speech coder, the second coding mode comprises a second speech coder, and the third coding mode comprises a music coder.

4. The method of claim 3, wherein the first speech coder is a code excited linear predictive (CELP) type coder, the second speech coder is a CELP/transform hybrid coder, and the music coder is a transform coder.

5. The method of claim 1, further comprising determining if the second classifier is enabled prior to providing the portion to the second classifier, and if the second classifier is not enabled, then encoding the portion with the third coding mode.

6. The method of claim 1, wherein classifying the portion at the second classifier as speech or as music comprises comparing a plurality of features of the portion to one or more thresholds to classify whether the portion has characteristics of music or characteristics of voiced speech.

7. The method of claim 6, wherein the characteristics of music comprise broadband noise-like characteristics of music, and the characteristics of voiced speech comprise at least one of tonal characteristics of voiced speech or quasi-stationary characteristics of voiced speech.

8. The method of claim 1, wherein classifying the portion at the second classifier as speech or as music comprises at least one of comparing the voicing of the portion to a first threshold, comparing the modified correlation to a second threshold, or comparing long term pitch gain to a third threshold.

9. The method of claim 8, wherein the voicing ranges from 0, corresponding to no correlation with speech, to 1, corresponding to high correlation with speech; wherein the modified correlation ranges from 0, corresponding to random noise, to 1, corresponding to highly structured sound; wherein the long term pitch gain is the normalized cross-correlation between the past excitation and the current prediction residual; and wherein the long term pitch gain ranges from 0, indicating that the error in the past portion is not adequate in representing the current portion, to 1, indicating that using the residual error in the past portion can completely represent the current portion.

10. The method of claim 1, wherein classifying the portion at the second classifier as speech or as music comprises determining if there is any signal activity in the portion, and if there is no signal activity, then determining that there is no useful signal to encode, and encoding the portion as speech.

11. An apparatus comprising:
    means for receiving a portion of an audio signal at a first classifier in a digital audio device;
    means for classifying, by the digital audio device, the portion of the audio signal at the first classifier as speech or as music;
    means for encoding, by the digital audio device, the speech using a first coding mode if the portion is classified by the first classifier as speech, or classifying, by the digital audio device, the portion at the second classifier as speech or as music when the portion is classified by the first classifier as music; and
    means for encoding, by the digital audio device, the portion using a second coding mode when the portion is classified at the second classifier as speech, or encoding, by the digital audio device, the portion using a third coding mode when the portion is classified at the second classifier as music.

12. The apparatus of claim 11, wherein the portion of the audio signal is a frame.

13. The apparatus of claim 11, wherein the first coding mode comprises a first speech coder, the second coding mode comprises a second speech coder, and the third coding mode comprises a music coder.

14. The apparatus of claim 13, wherein the first speech coder is a code excited linear predictive (CELP) type coder, the second speech coder is a CELP/transform hybrid coder, and the music coder is a transform coder.

15. The apparatus of claim 11, further comprising means for determining if the second classifier is enabled prior to providing the portion to the second classifier, and if the second classifier is not enabled, then encoding the portion with the third coding mode.

16. The apparatus of claim 11, wherein the means for classifying the portion at the second classifier as speech or as music comprises means for comparing a plurality of features of the portion to one or more thresholds to classify whether the portion has characteristics of music or characteristics of voiced speech.

17. The apparatus of claim 16, wherein the characteristics of music comprise broadband noise-like characteristics of music, and the characteristics of voiced speech comprise at least one of tonal characteristics of voiced speech or quasi-stationary characteristics of voiced speech.

18. The apparatus of claim 11, wherein the means for classifying the portion at the second classifier as speech or as music comprises at least one of means for comparing the voicing of the portion to a first threshold, means for comparing the modified correlation to a second threshold, and means for comparing long term pitch gain to a third threshold.

19. The apparatus of claim 18, wherein the voicing ranges from 0, corresponding to no correlation with speech, to 1, corresponding to high correlation with speech; wherein the modified correlation ranges from 0, corresponding to random noise, to 1, corresponding to highly structured sound; wherein the long term pitch gain is the normalized cross-correlation between the past excitation and the current prediction residual; and wherein the long term pitch gain ranges from 0, indicating that the error in the past portion is not adequate in representing the current portion, to 1, indicating that using the residual error in the past portion can completely represent the current portion.

20. The apparatus of claim 11, wherein the means for classifying the portion at the second classifier as speech or as music comprises means for determining if there is any signal activity in the portion, and if there is no signal activity, then determining that there is no useful signal to encode, and encoding the portion as speech.

21. A non-transitory computer-readable medium comprising computer-readable instructions for causing a processor to:
receive a portion of an audio signal at a first classifier in a digital audio device;
classify, by the digital audio device, the portion of the audio signal at the first classifier as speech or as music; and
process the portion of the audio signal, wherein processing the portion of the audio signal comprises:
if the portion is classified by the first classifier as speech, then encode, by the digital audio device, the speech using a first coding mode; or
if the portion is classified by the first classifier as music, then:
provide the portion to a second classifier in the digital audio device;
classify, by the digital audio device, the portion at the second classifier as speech or as music; and
encode the portion of the audio signal, wherein encoding the portion of the audio signal comprises:
if the portion is classified at the second classifier as speech, then encode, by the digital audio device, the portion using a second coding mode; or
if the portion is classified at the second classifier as music, then encode, by the digital audio device, the portion using a third coding mode.

22. The computer-readable medium of claim 21, wherein the portion of the audio signal is a frame.

23. The computer-readable medium of claim 21, wherein the first coding mode comprises a first speech coder, the second coding mode comprises a second speech coder, and the third coding mode comprises a music coder.

24. The computer-readable medium of claim 23, wherein the first speech coder is a code excited linear predictive (CELP) type coder, the second speech coder is a CELP/transform hybrid coder, and the music coder is a transform coder.

25. The computer-readable medium of claim 21, further comprising instructions that cause the processor to determine if the second classifier is enabled prior to providing the portion to the second classifier, and if the second classifier is not enabled, then encode the portion with the third coding mode.

26. The computer-readable medium of claim 21, wherein classifying the portion at the second classifier as speech or as music comprises comparing a plurality of features of the portion to one or more thresholds to classify whether the portion has characteristics of music or characteristics of voiced speech.

27. The computer-readable medium of claim 26, wherein the characteristics of music comprise broadband noise-like characteristics of music, and the characteristics of voiced speech comprise at least one of tonal characteristics of voiced speech or quasi-stationary characteristics of voiced speech.

28. The computer-readable medium of claim 21, wherein classifying the portion at the second classifier as speech or as music comprises at least one of comparing the voicing of the portion to a first threshold, comparing the modified correlation to a second threshold, or comparing long term pitch gain to a third threshold.

29. The computer-readable medium of claim 28, wherein the voicing ranges from 0, corresponding to no correlation with speech, to 1, corresponding to high correlation with speech; wherein the modified correlation ranges from 0, corresponding to random noise, to 1, corresponding to highly structured sound; wherein the long term pitch gain is the normalized cross-correlation between the past excitation and the current prediction residual; and wherein the long term pitch gain ranges from 0, indicating that the error in the past portion is not adequate in representing the current portion, to 1, indicating that using the residual error in the past portion can completely represent the current portion.

30. The computer-readable medium of claim 21, wherein classifying the portion at the second classifier as speech or as music comprises determining if there is any signal activity in the portion, and if there is no signal activity, then determining that there is no useful signal to encode, and encoding the portion as speech.

31. An apparatus comprising:
a processor;
memory in electronic communication with the processor; and
instructions stored in the memory, the instructions being executable by the processor to:
receive a portion of an audio signal at a first classifier in a digital audio device;
classify, by the digital audio device, the portion of the audio signal at the first classifier as speech or as music; and
process the portion of the audio signal, wherein processing the portion of the audio signal comprises:
if the portion is classified by the first classifier as speech, then encode, by the digital audio device, the speech using a first coding mode; or
if the portion is classified by the first classifier as music, then:
provide the portion to a second classifier in the digital audio device;
classify, by the digital audio device, the portion at the second classifier as speech or as music; and
encode the portion of the audio signal, wherein encoding the portion of the audio signal comprises:
if the portion is classified at the second classifier as speech, then encode, by the digital audio device, the portion using a second coding mode; or
if the portion is classified at the second classifier as music, then encode, by the digital audio device, the portion using a third coding mode.

32. The processor of claim 31, wherein the portion of the audio signal is a frame.

33. The processor of claim 31, wherein the first coding mode comprises a first speech coder, the second coding mode comprises a second speech coder, and the third coding mode comprises a music coder.

34. The processor of claim 33, wherein the first speech coder is a code excited linear predictive (CELP) type coder, the second speech coder is a CELP/transform hybrid coder, and the music coder is a transform coder.

35. The processor of claim 31, wherein the instructions are also executable to determine if the second classifier is enabled prior to providing the portion to the second classifier, and if the second classifier is not enabled, then encode the portion with the third coding mode.

36. The processor of claim 31, wherein the instructions executable to classify the portion at the second classifier as speech or as music comprise instructions executable to compare a plurality of features of the portion to one or more thresholds to classify whether the portion has characteristics of music or characteristics of voiced speech.

37. The processor of claim 36, wherein the characteristics of music comprise broadband noise-like characteristics of music, and the characteristics of voiced speech comprise at least one of tonal characteristics of voiced speech or quasi-stationary characteristics of voiced speech.

38. The processor of claim 31, wherein the instructions executable to classify the portion at the second classifier as speech or as music comprise at least one of instructions executable to compare the voicing of the portion to a first threshold, instructions executable to compare the modified correlation to a second threshold, or instructions executable to compare long term pitch gain to a third threshold.

39. The processor of claim 38, wherein the voicing ranges from 0, corresponding to no correlation with speech, to 1, corresponding to high correlation with speech; wherein the modified correlation ranges from 0, corresponding to random noise, to 1, corresponding to highly structured sound; wherein the long term pitch gain is the normalized cross-correlation between the past excitation and the current prediction residual; and wherein the long term pitch gain ranges from 0, indicating that the error in the past portion is not adequate in representing the current portion, to 1, indicating that using the residual error in the past portion can completely represent the current portion.

40. The processor of claim 31, wherein the instructions executable to classify the portion at the second classifier as speech or as music comprise instructions executable to determine if there is any signal activity in the portion, and if there is no signal activity, then determine that there is no useful signal to encode, and encode the portion as speech.

* * * * *